United States Patent
Pal et al.

(10) Patent No.: US 9,819,745 B2
(45) Date of Patent: Nov. 14, 2017

(54) SYSTEM AND METHOD FOR PREVENTION OF DENIAL OF SERVICE ATTACKS FOR HOSTED NETWORK ADDRESS TRANSLATOR

(71) Applicant: Extreme Networks, Inc., San Jose, CA (US)

(72) Inventors: Biswajyoti Pal, Navi Mambai (IN); Manish Chatterjee, Calcutta (IN)

(73) Assignee: Extreme Networks, Inc., San Jose, CA (US)

( * ) Notice: Subject to any disclaimer, the term of this patent is extended or adjusted under 35 U.S.C. 154(b) by 127 days.

(21) Appl. No.: 14/794,989

(22) Filed: Jul. 9, 2015

(65) Prior Publication Data

US 2017/0012776 A1  Jan. 12, 2017

(51) Int. Cl.
*H04L 29/06* (2006.01)
*H04L 29/08* (2006.01)
*H04L 9/32* (2006.01)
*H04L 9/00* (2006.01)
*H04L 29/12* (2006.01)

(52) U.S. Cl.
CPC ............ *H04L 67/141* (2013.01); *H04L 9/002* (2013.01); *H04L 9/3239* (2013.01); *H04L 61/2514* (2013.01); *H04L 63/1458* (2013.01); *H04L 65/1006* (2013.01); *H04L 65/608* (2013.01); *H04L 61/2517* (2013.01)

(58) Field of Classification Search
CPC ............ H04L 63/1458; H04L 65/1006; H04L 65/608; H04L 63/12; H04L 67/141; H04L 9/002; H04L 9/14; H04L 9/3239; H04L 61/2514; H04L 61/2517

USPC ........................................................ 713/164
See application file for complete search history.

(56) References Cited

U.S. PATENT DOCUMENTS

| | | | |
|---|---|---|---|
| 2003/0135625 A1* | 7/2003 | Fontes | H04L 63/12 709/228 |
| 2007/0121596 A1* | 5/2007 | Kurapati | H04L 29/06027 370/356 |

OTHER PUBLICATIONS

Jitsi et al., "Latching: Hosted NAT Transversal (HNT) for Media in Real-Time Communication," Internet Engineering Task Force, RFC 7362, 2014, 16 pages.*

(Continued)

*Primary Examiner* — Yogesh Paliwal
(74) *Attorney, Agent, or Firm* — Haley Guiliano LLP

(57) ABSTRACT

To determine the correct media stream to latch onto, the system and method uses a hashing algorithm to uniquely identify a legitimate media stream. A first invite message is received at a Session Border Controller (SBC) to establish a communication session. For example a Session Initiation Protocol (SIP) INVITE is received. The first invite message comprises a first hash of a fingerprint. For example, the hash may be a hashed session key. A media message is received that contains the fingerprint to establish a media stream for the communication session. A second hash is created using the fingerprint in the media message. The first hash is compared to the second hash. In response to the first hash matching the second hash, a Network Address Translator (NAT) latches to an address and/or a port in the media message. Thus, the correct media stream is associated with the communication session.

20 Claims, 4 Drawing Sheets

(56) References Cited

OTHER PUBLICATIONS

Handley et al., "SDP: Session Description Protocol," Network Working Group, RFC 4566, 2006, 43 pages.
Baugher et al., "The Secure Real-time Transport Protocol (SRTP)," Network Working Group, RFC 3711, 2004, 56 pages.

* cited by examiner

SYSTEM AND METHOD FOR PREVENTION OF DENIAL OF SERVICE ATTACKS FOR HOSTED NETWORK ADDRESS TRANSLATOR

TECHNICAL FIELD

The systems and methods disclosed herein relate network protection systems and in particular to prevention of denial of service attacks.

BACKGROUND

When endpoints make calls from a public network into an enterprise network, the enterprise network will typically have a firewall to protect the enterprise network. For example, the enterprise network may have a Network Address Translator (NAT) and/or a Session Border Controller (SBC) to provide network address translation and network security. NATs use a technique called latching to traverse the firewall as described in Internet Engineering Task Force (ITEF) RFC 7362, "Latching: Hosted NAT Transversal (HNT) for Media in Real-Time Communication," September 2014, which is incorporated herein in its entirety by reference. The NAT listens on the public side IP address and/or port sent out through SDP and then latches on to the media source IP-port (at the accessible side of the firewall), when Real-time Transport Protocol (RTP) media begins to stream.

However, because the NAT latches on to the first media stream that has the IP address and/or port, this may open up the enterprise to denial of service attacks. Malicious entities can continuously flood all the ports of the public side of the NAT with a denial of service attack to cause the NAT to latch on to an invalid media stream. Alternatively, malicious entities can monitor incoming traffic and send a packet with the IP address/port, thus causing the NAT to latch to an invalid media stream. Because the NAT latches to an invalid media stream, the improper latching prevents legitimate endpoints form establishing calls to the enterprise network.

SUMMARY

Systems and methods are provided to solve these and other problems and disadvantages of the prior art. To determine the correct media stream to latch onto, the system and method uses a hashing algorithm to uniquely identify a legitimate media stream. A first invite message is received at a Session Border Controller (SBC) to establish a communication session. For example a Session Initiation Protocol (SIP) INVITE is received. The first invite message comprises a first hash of a fingerprint. For example, the hash may be a hashed session key. A media message is received that contains the fingerprint to establish a media stream for the communication session. A second hash is created using the fingerprint in the media message. The first hash is compared to the second hash. In response to the first hash matching the second hash, a Network Address Translator (NAT) latches to an address and/or a port in the media message. Thus, the correct media stream is associated with the communication session.

DETAILED DESCRIPTION

Figure 1:
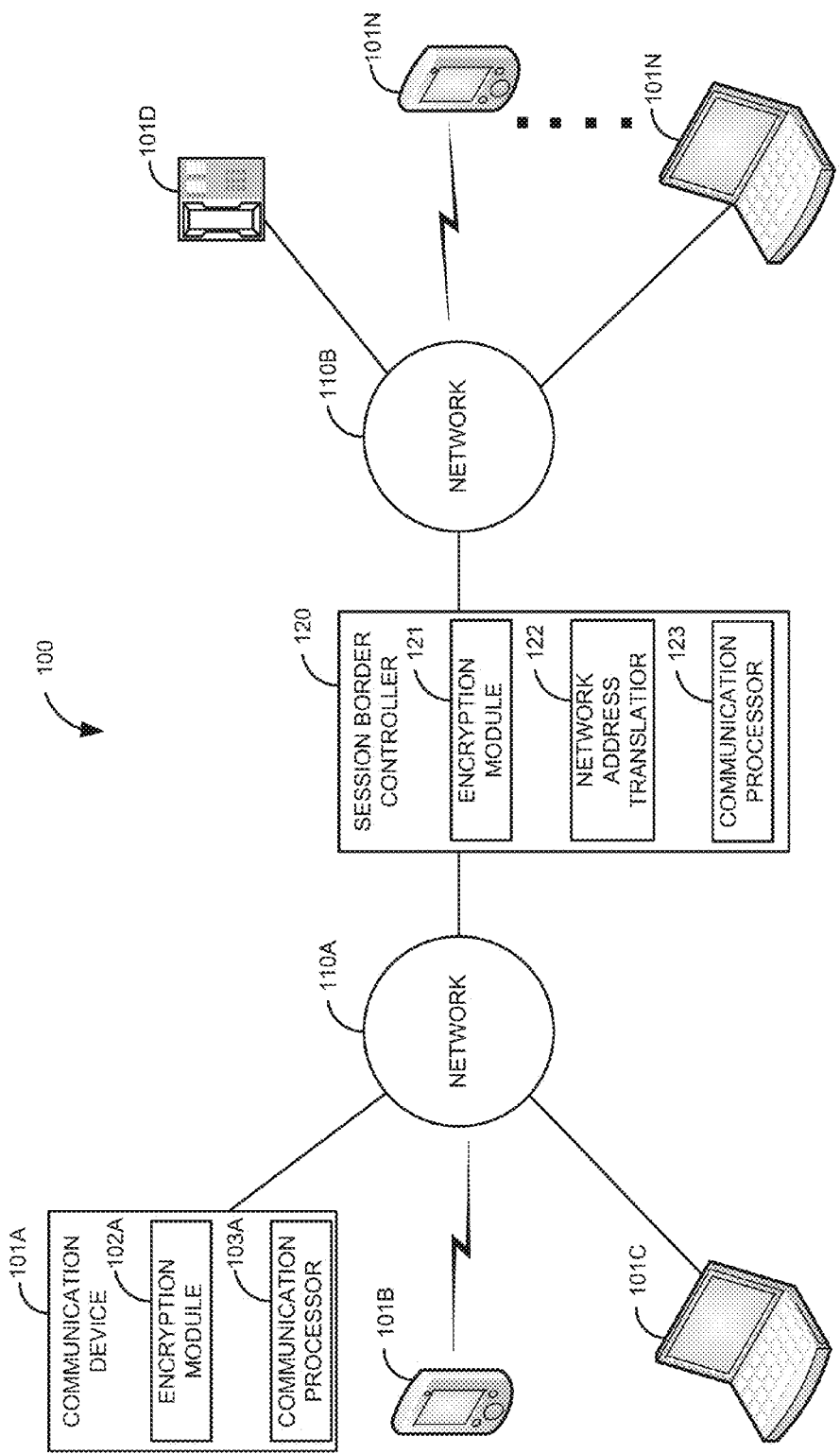
FIG. 1 is a block diagram of a first illustrative system for latching onto a legitimate media stream.

FIG. 1 is a block diagram of a first illustrative system 100 for latching onto a legitimate media stream. The first illustrative system 100 comprises communication devices 101A-101N, networks 110A-110B, and a Session Border Controller (SBC) 120.

The communication devices 101A-101N can be or may include any device that can communicate on the networks 110A-110B, such as a Personal Computer (PC), a telephone, a video system, a cellular telephone, a Personal Digital Assistant (PDA), a tablet device, a notebook device, a smart phone, a media server, a file server, a web server, and/or the like. As shown in FIG. 1, any number of communication devices 101A-101N may be connected to either of the networks 110A-110B.

The communication device 101A is shown to further comprise an encryption module 102A and a communication processor 103A. The encryption module 102A can be any hardware/software that can provide encryption services. The encryption module 102A can use a variety of encryption protocols/hashing algorithms, such as Session Description Protocol as described in Network Working Group RFC 4566, "SDP: Session Description Protocol." July, 2006, which is incorporated herein in its entirety by reference. Public Key Infrastructure (PKI), BLAKE-256, BLAKE-512, ECOH, GOST, HAS-160, HAVAL, JH, MD2, MD4, MD5, MD6, RadioGatun, RIPEMD, RIPEMD-128, RIPEND-160, RIPEMD-320, SHA-1, SHA-3 SHA-224, SHA-256, SHA-512, Skein, SipHash, Snefru, Spectral Hash, SWIFFT, Tiger, Whirlpool, and the like. Although not shown, the communication devices (101B-101C) on the network 110A may also include the encryption module 102.

The communication processor 103A can be any hardware that uses software to communicate on the network 110A, such as a microprocessor, a digital signaling processor, a microcontroller, and/or the like. The communication processor 103 can process a variety of communication protocols, such as Session Initiation Protocol (SIP), Transport Communication Protocol/Internet Protocol (TCP/IP), User Datagram Protocol/Internet Protocol (UDP/IP), H.323, Real-time Transport Protocol (RTP), Web Real-Time Communication (WebRTC), Session Description Protocol (SDP), video protocols, and/or the like. Although not shown, the communication devices (101B-101C) on the network 110A may also include the communication processor 103.

The networks 110A-110B can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The networks 110A-110B can use a variety of electronic protocols, such as Ethernet, IP, SIP, Integrated Services Digital Network (ISDN), RTP, SDP, H.323, WebRTC, and the like. Thus, the networks 110A-110B are electronic communication networks configured to carry messages via packets and/or circuit switched communications. Typically, the network 110A is a public network, such as the Internet and the network 110B is a private network, such as an enterprise or corporate network.

The Session Border Controller (SBC) 120 can be or may include any hardware/software that can provide security services for the network 110B, such as a firewall, a gateway, and/or the like. The SBC 120 further comprises an encryption module 121, a NAT 122, and a communication processor 123. The encryption module 121 is similar to the encryption module 102. The encryption module 121 provides complimentary encryption services to the encryption module 102.

The NAT 122 can be any hardware/software that can provide network address translation. The NAT 122 can provide translation services to translate routable IP address (e.g., IP addresses that are used on the network 110A) and non-routable IP addresses (e.g., IP addresses that are used on the network 110B). The NAT 122 may support HNT as described in RFC 7362.

The communication processor 123 can be any processor that can process communications. The communication processor 123 can process a variety of communication protocols, such as SIP, TCP/IP, UDP/IP, H.323, RTP, WebRTC, video protocols, SDP, and/or the like. The communication processor 123 is typically coupled with software and/or firmware to process the communication protocols.

Figure 2:
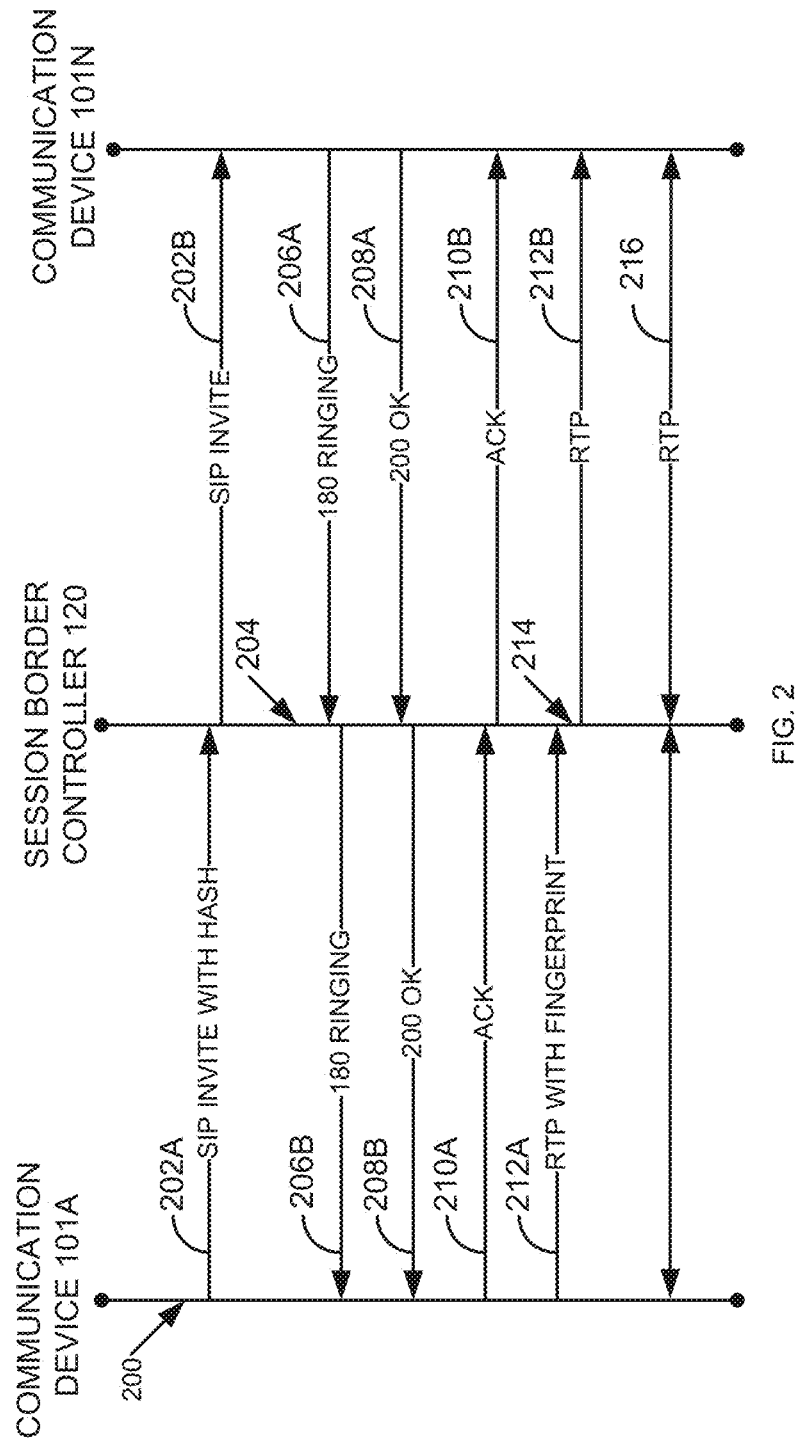
FIG. 2 is a flow diagram of a process for latching onto a legitimate media stream.
Figure 3:
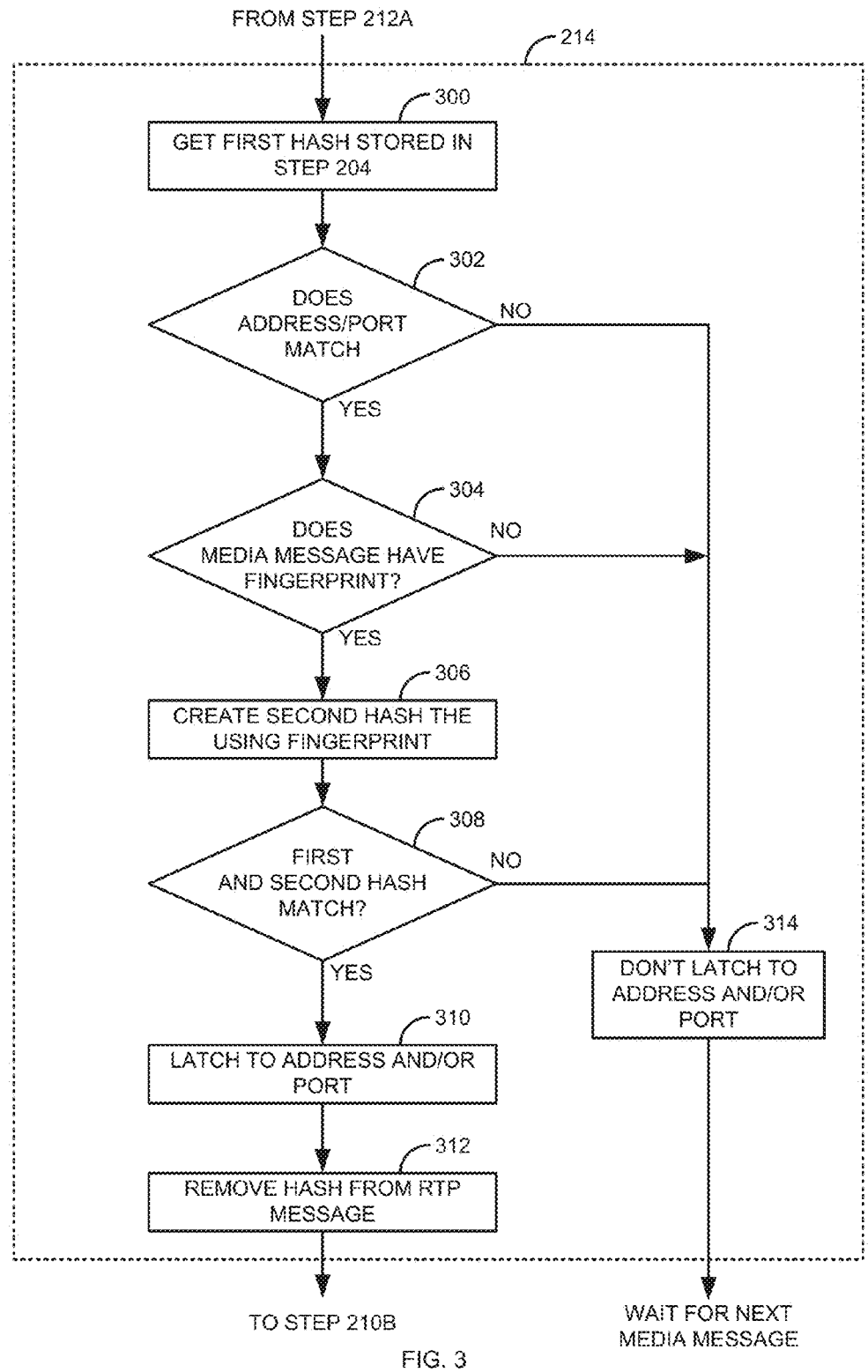
FIG. 3 is a flow diagram of a process to determine a legitimate media stream to latch onto.
Figure 4:
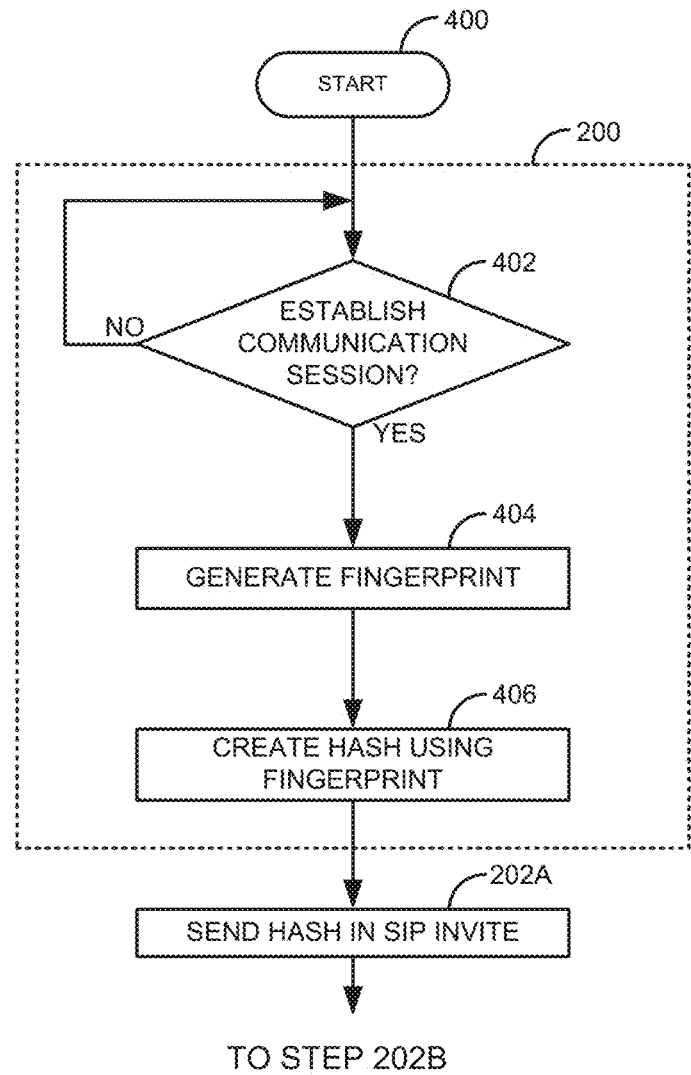
FIG. 4 is a flow diagram of a process for creating a hash using a fingerprint.

FIG. 2 is a flow diagram of a process for latching onto a legitimate media stream. Illustratively, the communication devices 101A-101N, the encryption module 102, the communication processor 103, the SBC 120, the encryption module 121 the NAT 122, and the communication processor 123 are stored-program-controlled entities, such as a computer or processor, which performs the method of FIGS. 2-4 and the processes described herein by executing program instructions stored in a non-transitory computer readable storage medium, such as a memory or disk. Although the methods described in FIGS. 2-4 are shown in a specific order, one of skill in the art would recognize that the steps in FIGS. 2-4 may be implemented in different orders and/or be implemented in a multi-threaded environment. Moreover, various steps may be omitted or added based on implementation.

The process of FIG. 2 is an exemplary embodiment that uses the Session Initiation Protocol (SIP), Session Description Protocol (SDP), and Real-time Transport Protocol (RTP). However, the invention is not limited to the use of these specific protocols. The process of FIGS. 2-4 may use other protocols, such as H.323, Web Real-Time Communication (WebRTC), Secure SDP, video protocols, and the like. For example, instead of using SIP, WebRTC can be used in conjunction with RTP to establish communication sessions.

The processes of FIGS. 2-4 are described based on a communication session between the communication devices 101A and 101N. However, the process described for FIGS. 2-4 will also work for any communication sessions between the communication devices 101A-101C and the communication devices 101D-101N. The process of FIGS. 2-4 can work where there are multiple communication sessions being initiated at the same time.

The process starts in step 200 when the communication device 101A wants to establish a SIP communication session with the communication device 101N. The encryption module 102A gets and/or generates a fingerprint, such as an encryption key, a session key, and/or the like. The encryption module 102A takes the fingerprint and uses the fingerprint as an input to a hashing algorithm to create a hash. For example, the encryption module 102A takes the session key AABBCCDDEE as an input to the Message-Digest (MD) algorithm version 5 (MD-5) to create the hash.

The communication processor 103A sends in step 202A a SIP INVITE message that includes the hash. The hash can be in different fields in the SIP INVITE depending upon implementation. For example, the hash may be in a SIP header. Alternatively, the hash can be sent in a SDP header. In one embodiment, the hash is in a SDP <fmt> header. The SDP <fmt> header is normally used to describe the format of the media stream (e.g., as described in RFC 4566). However, in this embodiment, the <fmt> header is used to carry the hash for latching onto a legitimate media stream by the NAT 122. In one embodiment, the SDP <fmt> header includes an additional field to indicate the presence of the hash. For example, a field such as "x-verify" can be defined to indicate the presence of the hash in the SDP <fmt> header where the hash is identified using a "verify-hash=<hash>." The fields defined in the SDP <fmt> header may be proprietary headers. In addition, the SIP INVITE of step 202A includes a routable IP address and port because the network 110A is a network that uses routable IP addresses, such as the Internet.

To illustrate, consider the following example. The SIP INVITE can include the following: a=rtpmap:105 x-verify a=fmtp:105 verify-hash=AB . . . YZ. The a=rtpmap:105 is to identify the fmt format and the x-verify is to indicate the presence of the hash in the verify-hash field. The verify-hash is where the hash is located.

When the communication processor 123, via the SBC 120, receives the SIP INVITE of step 202A, the NAT 122 translates the pubic IP address/port of the communication device 101A to a non-mutable IP address/port of the communication device 101N. For example, the NAT 122 changes the routable IP address to the IP address of 192.0.2.1 and the port to 22007. The communication processor 123 then sends the SIP INVITE with the changed IP address/port to the communication device 101N in step 202B. The SIP INVITE of step 202B does not need to have the hash information because the communication device 101N does not use the hash. For example, the communication processor 123 may remove the hash before sending the SIP INVITE of step 202B. The encryption module 121 stores the hash in step 204. In one embodiment, step 204 may occur before step 202B.

The communication device 101N responds with a SIP 180 RINGING message in step 206A. The communication processor 123 receives the SIP RINGING message of step 206A. The NAT 122 translates the unroutable IP Address/port of the communication device 101N to the IP address/port of the communication device 101A in the 180 RINGING message of step 206B. The communication processor 123 sends the SIP RINGING message of step 206B. When the call is answered, the communication device 101N sends a SIP 200 OK message in step 208A. The communication processor 123 receives the SIP 200 OK message of step 208A. The NAT 122 again translates the IP address/port of the communication device 101N for the SIP 200 OK message of step 208B. The communication processor 123 sends the translated SIP 200 OK message in step 208B. The communication device 101A sends a SIP ACK message in step 210A. The communication processor 123 receives the SIP ACK message of step 210A. The NAT 122 translates the routable IP address/port of the communication device 101A to the unroutable IP address/port of the communication device 101N in the SIP ACK of step 210B. The communication processor 123 sends the SIP ACK of step 210B.

The communication device 101A sends in step 212A a RTP message for the media stream (e.g., the voice for a voice call). The RTP message of step 212A includes the fingerprint that was used to generate the hash of step 202A. The fingerprint can be in different places in the RTP message. For example, the fingerprint may be part of the payload of the RTP message. The payload of the RTP message normally only includes the media (e.g., the voice for a voice call); but in this embodiment, the fingerprint is part of the payload of the RTP message. The size and placement of the fingerprint may vary. For example, the first 10 bytes of the payload of the RTP message of step 212A may contain the fingerprint. In another embodiment, the fingerprint may be in the last 8 bytes of the RTP message of step 212A. Alternatively, the fingerprint may be in a header of the RTP message of step 212A.

The communication processor 123 receives the RTP message of step 212A. The encryption module 121 generates a second hash using the fingerprint received in the RTP message of step 212A in step 214. The second hash is compared to the stored hash of step 204 to see if the hashes match. If the hashes match in step 214, the NAT 122 latches on to the IP address and/or port of the RTP message of step 212A. The NAT 122 translates the IP address/port in the RTP message to the unroutable IP address/port of the communication device 101N in step 212B. The two communication devices 101A and 101N can then send each other the media for the communication session in step 216 via the SBC 120 where the NAT 122 translates the addresses/ports. For example the communication devices 101A and 101N can each send video streams for a video communication in step 216.

If the hashes do not match, the NAT 122 does not latch on to the IP address/port of the RTP message of step 212A. If the NAT 122 cannot find a communication session that matches the second hash, the RTP message of step 212A is dropped because the RTP message of step 212A is not a legitimate RTP message. For example, the RTP message of step 212A may be a message that is part of a denial of service attack.

FIG. 3 is a flow diagram of a process to determine a correct media stream to latch onto. FIG. 3 is an expanded view of Step 214 of FIG. 2. After receiving the RPT message with the fingerprint in step 212A, the encryption module 121 gets, in step 300, the hash that was stored in step 204 (from the SIP INVITE message of step 202A). The NAT 122 can optionally determine if the IP address/port of the RTP message of step 212A matches the IP address/port in the SIP INVITE message of step 202A. Step 302 is optional because the comparison of the hashes in step 308 can verify a correct match. If the IP address and/or port do not match in step 302, the NAT 122 does not latch, in step 314, to the address and/or port of the RTP message of step 212A. The process then waits for the next media message to see if there is a match. For example, the media message may be for another communication session (e.g., where there are multiple communication sessions being established at the same time).

If the IP address/port matches in step 302, the encryption module 121 determines in step 304 if the media message of step 212A has a fingerprint. If the media message does not have a fingerprint in step 304, the NAT 122 does not latch, in step 314, to the IP address/port of the RTP message of step 212A. Otherwise, if the media message has the fingerprint in step 304, the encryption module 121 creates a second hash using the fingerprint in step 306. The encryption module 121 compares the hash saved in step 204 to the second hash in step 308. If the two hashes do not match in step 308, the NAT 122 does not latch, in step 314, to the IP address/port of the RTP message of step 212A.

Otherwise, if the two hashes match in step 308, the NAT 122 latches onto the IP address and/or port of the RTP message of step 212A in step 310. The NAT 122 can optionally remove, in step 312, the hash from the RTP message of step 212A. The process then goes to step 212B where the RTP message of step 212A is sent to the communication device 101N.

FIG. 4 is a flow diagram of a process for creating a hash using a fingerprint. FIG. 4 is an exemplary process for step 200 of FIG. 2. The process of FIG. 4 is from the perspective of the communication device 101. The process starts in step 400. The communication processor 103 determines in step 402 if a communication session is to be established. A communication session can be any type of communication session, such as a voice communication session, a video communication session, an Instant Messaging communication session, and/or the like. If the request to establish a communication session is not received in step 402, the process repeats step 402. If a request to establish a communication session is received in step 402, the encryption module 102 generates a fingerprint in step 404. The fingerprint can be a fingerprint that changes for each communication session. For example, the encryption module 102 can use a key derivation process as described in Network Working Group RFC 3711 "The Secure Real-time Transport Protocol," March 2004, which contents are incorporated herein in its entirety by reference. The session key in SRTP is based on a known key that both the SBC 120 and the communication device 101A have exchanged. This way each SIP INVITE message will use a different fingerprint for each communication session.

The encryption module 102 creates a hash using the fingerprint in step 406. For example using MD5 as described previously. The communication processor 103 then sends the SIP INVITE with the hash in step 202A. The communication processor 103 later sends the RTP message with the fingerprint in step 212A. The encryption module 121 can then verify that the communication session is a legitimate communication session.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:
1. A method comprising:
   receiving, by a processor, a first invite message to establish a first communication session, wherein the first invite message comprises a first hash of a first fingerprint;
   receiving, by the processor, a media message, containing the first fingerprint, to establish a media stream for the communication session;
   creating, by the processor, a second hash using the first fingerprint in the media message;
   comparing, by the processor, the first hash to the second hash; and in response to the first hash matching the second hash, latching to an address and/or a port in the media message.

2. The method of claim 1, further comprising:
in response to the first hash not matching the second hash, not latching to the address or the port in the media message.

3. The method of claim, 1 wherein the first hash uses at a hashing algorithm that is one of the following: BLAKE-256, BLAKE-512, ECOH, GOST, HAS-160, HAVAL, JH, MD2, MD4, MD5, MD6, RadioGatun, RIPEMD, RIPEMD-128, RIPEND-160, RIPEMD-320, SHA-1, SHA-3 SHA-224, SHA-256, SHA-512, Skein, SipHash, Snefru, Spectral Hash, SWIFFT, Tiger, or Whirlpool.

4. The method of claim 1, wherein the first communication session is one of a Session Initiation Protocol (SIP) communication session, an H.323 communication session, or a Web Real-Time Communication (WebRTC) communication session.

5. The method of claim 1, wherein the first invite message is a first Session Initiation Protocol (SIP) INVITE message, wherein the media message is a Real-time Transport Protocol (RTP) or a Secure RTP (SRTP) message, and wherein the first communication session is a SIP communication session.

6. The method of claim 5, wherein the first hash is sent in a SIP header in the first SIP INVITE.

7. The method of claim 5, further comprising:
receiving a second SIP INVITE to establish a second SIP communication session, wherein the second SIP INVITE comprises a second hash of a second fingerprint, wherein the second fingerprint is different from the first fingerprint.

8. The method of claim 5, wherein the first fingerprint is sent in a payload of the RTP or SRTP message.

9. The method of claim 5, wherein the first hash is sent in a Session Description Protocol (SDP) <fmt>header in the first SIP INVITE message.

10. The method of claim 9, wherein the SDP <fmt>header has an additional header that indicates a presence of the first hash.

11. A session border controller comprising:
a microprocessor; and
a computer readable medium, coupled with the microprocessor and comprising microprocessor readable and executable instructions that cause the microprocessor to:
receive a first invite message to establish a first communication session, wherein the first invite message comprises a first hash of a first fingerprint, receive a media message containing the first fingerprint to establish a media stream for the communication session, create a second hash using the first fingerprint in the media message, compare the first hash to the second hash, and latch to an address and/or a port in the media message in response to the first hash matching the second hash.

12. The session border controller of claim 11, wherein the instructions further cause the microprocessor to not latch to the address or the port in the media message in response to the first hash not matching the second hash.

13. The session border controller of claim 11, wherein the first communication session is one of a Session Initiation Protocol (SIP) communication session, an H.323 communication session, or a Web Real-Time Communication (WebRTC) communication session.

14. The session border controller of claim 11, wherein the first invite message is a first Session Initiation Protocol (SIP) INVITE message, wherein the media message is a Real-time Transport Protocol (RTP) or a Secure RTP (SRTP) message, and wherein the first communication session is a SIP communication session.

15. The session border controller of claim 14, wherein the first hash is sent in a SIP header in the first SIP INVITE.

16. The session border controller of claim 14, wherein the instructions further cause the microprocessor to receive a second SIP INVITE to establish a second SIP communication session and wherein the second SIP INVITE comprises a second hash of a second fingerprint, wherein the second fingerprint is different from the first fingerprint.

17. The session border controller of claim 14, wherein the first fingerprint is sent in a payload of the RTP or SRTP message.

18. The session border controller of claim 14, wherein the first hash is sent in a Session Description Protocol (SDP) <fmt>header in the first SIP INVITE message.

19. The session border controller of claim 18, wherein the SDP <fmt>header has an additional header that indicates a presence of the first hash.

20. A communication device comprising:
a microprocessor; and
a computer readable medium, coupled with the microprocessor and comprising microprocessor readable and executable instructions that cause the microprocessor to:
generate a hash of a fingerprint; and
send an invite message that comprises the hash of a fingerprint to a Session Border Controller (SBC), wherein the invite message is to establish a communication session, and send a media message to the SBC that includes the fingerprint, wherein the SBC uses the hash of the fingerprint and the fingerprint to determine whether to latch to an address and/or a port in the media message.

* * * * *